(12) United States Patent
Miller et al.

(10) Patent No.: US 7,243,969 B2
(45) Date of Patent: Jul. 17, 2007

(54) MODULAR STORAGE APPARATUS

(76) Inventors: F. Todd Miller, P.O. Box 2456, Whitney, TX (US) 76692; Laurie A. Miller, P.O. Box 2456, Whitney, TX (US) 76692

( * ) Notice: Subject to any disclaimer, the term of this patent is extended or adjusted under 35 U.S.C. 154(b) by 303 days.

(21) Appl. No.: 11/065,427

(22) Filed: Feb. 24, 2005

(65) Prior Publication Data

US 2006/0186771 A1   Aug. 24, 2006

(51) Int. Cl.
*B60P 7/08* (2006.01)
(52) U.S. Cl. ............... 296/37.8; 296/37.15; 296/37.16; 410/46
(58) Field of Classification Search ............ 296/37.15, 296/37.6, 37.8, 37.16, 24.43; 410/46, 77, 410/80; 224/403, 404, 539
See application file for complete search history.

(56) References Cited

U.S. PATENT DOCUMENTS 7,048,320 B2 *  5/2006  Rubel et al.

* cited by examiner

*Primary Examiner*—Stephen Gordon
(74) *Attorney, Agent, or Firm*—Robert L. Greeson

(57) ABSTRACT

A modular storage apparatus having a base member comprised of an outer shell and an interior support frame. The outer shell has a bottom surface configured to attach to the tie down bolts of a rear seating support of a typical Sports Utility Vehicle. A top surface may be reversibly inset within lateral support walls to serve as a base for cargo contained in various attachments. One or more compartments contained within the outer shell may be actuated between an open and closed position by sliding each compartment along an opposing pair of interior support frame members. The outer shell, in combination with moveable magnets and threaded engagement means, provides support for various cargo containing attachment members.

5 Claims, 3 Drawing Sheets

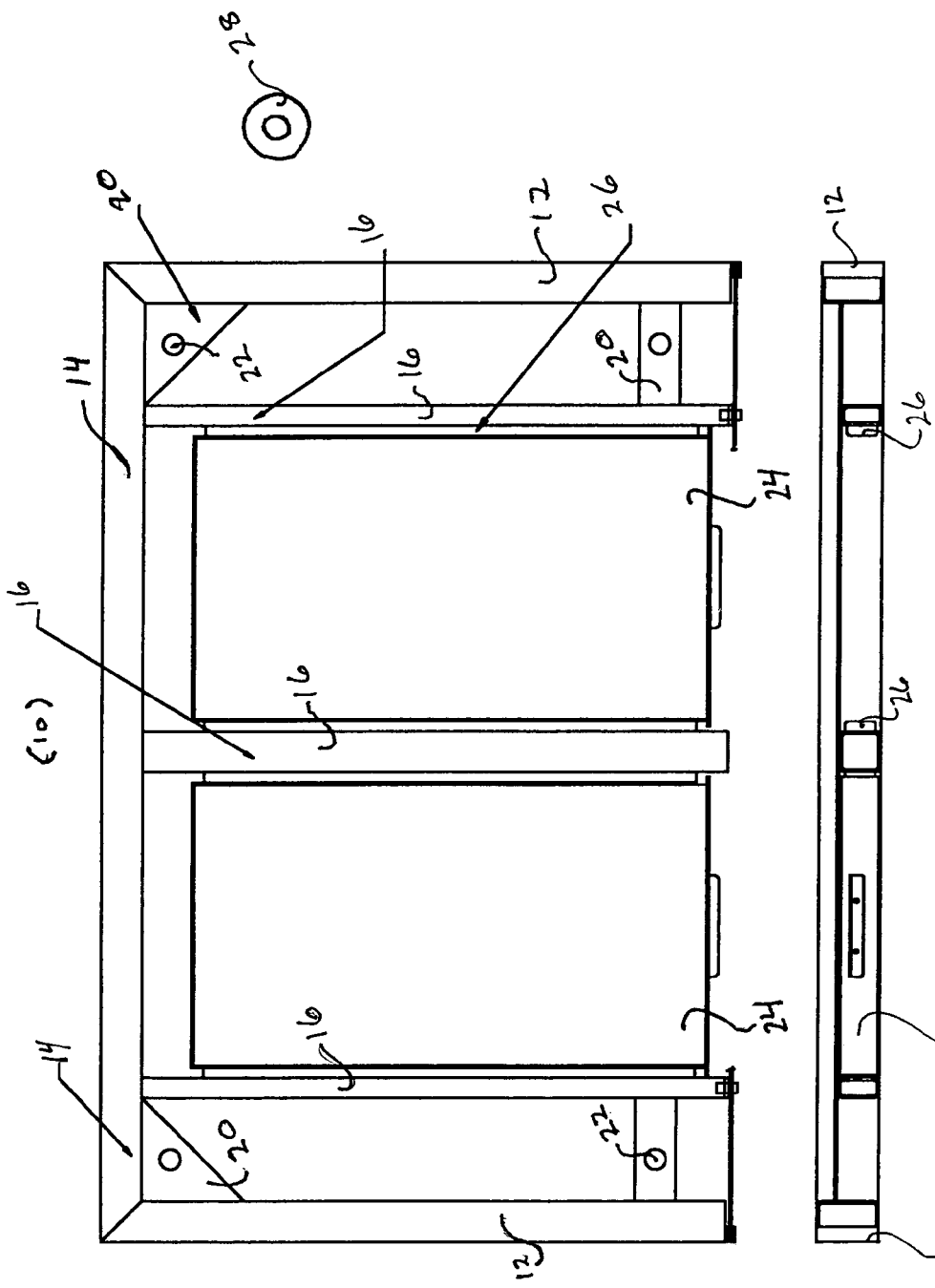

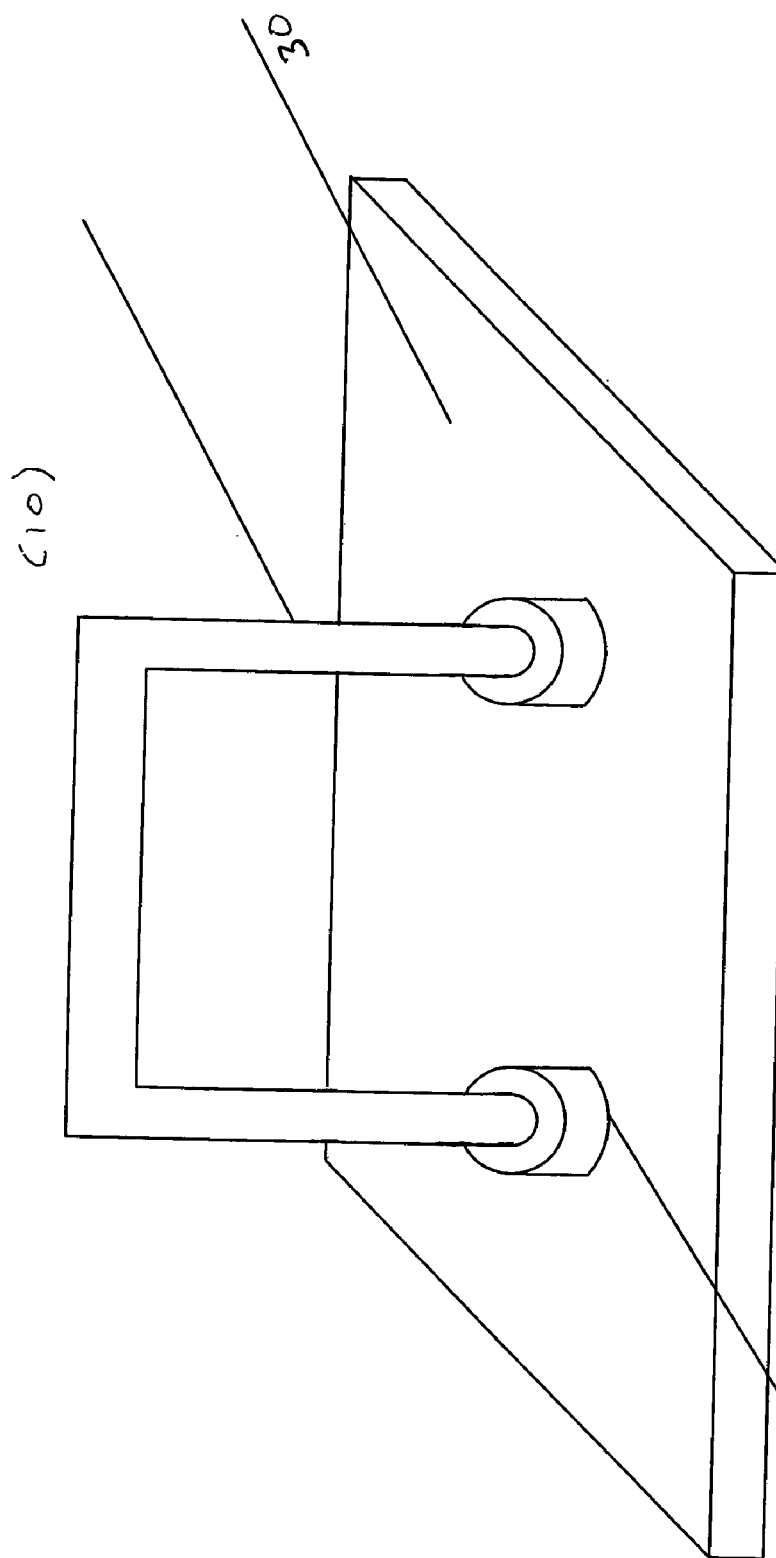

MODULAR STORAGE APPARATUS

BACKGROUND OF THE INVENTION

1. Field of the Invention

The present invention generally relates to a modular storage apparatus. More particularly, the present invention relates to a modular storage apparatus configured for engagement with a vehicle seat support and cargo "tie down rings," and further configured to be arranged or fitted together in a variety of ways.

2. Background Information

The use of storage devices is known in the art. More specifically, storage devices heretofore devised and utilized are known to consist basically of familiar, expected and obvious structural configurations, notwithstanding the myriad of designs encompassed by the crowded prior art which have been developed for the fulfillment of various objectives and requirements. While these devices may fulfill their respective, particularly claimed objectives and requirements, the aforementioned devices do not disclose an improved modular storage apparatus such as Applicant's present invention.

One of the several benefits provided by the Sports Utility Vehicle ("SUV") of today is its ability to accommodate several passengers while providing ample storage space for various cargo. Common SUV's offer multiple rows of seating while providing storage space below and behind each row of chairs. Further, these vehicles commonly allow its driver and passengers the option of arranging combinations of seats between an upright and folded position to provide distinct seating and storage configurations. Despite their accommodations, vehicles have yet to provide a means whereby cargo contained therein can be secured or organized in an efficient and secure manner.

While the notion of unsecured cargo in a vehicle may seem trivial at first glance, upon further examination its nature as a problem needed to be solved becomes clear. For example, it is well documented that thousands of accident-related deaths occur each year, not caused by the collision with other vehicles, but instead caused by unsecured cargo being propelled from its resting area to persons within the vehicle.

The absence of a viable way to secure cargo within a vehicle presents other problems as well. It is well known that more often than not, a vehicle is broken into not with the objective to steal the vehicle itself, but to take the valuables contained therein. As such, one does not have to look hard to see that if valuable cargo could be effectively concealed and secured within a vehicle, the likelihood of such crime would necessarily decrease.

More frequently occurring problems, although less severe in nature, cause significant problems on a daily basis. All to often, someone stows moveable items such as tools, groceries, or work supplies in the rear of their SUV only to have those items jostled and thrown about while in transit. Without a secure apparatus to anchor stored items, cargo is free to move about the vehicle storage area. These problems are exaggerated where fluids stored in the rear of the vehicle present the potential for leaks and spills. Further, in the event dangerous items such as heavy machinery or sharp tools are stored, the movement of these items is likely to cause damage to other cargo, the vehicle, or persons riding in the vehicle.

SUMMARY OF THE INVENTION

The general purpose of the present invention, which will be described subsequently in greater detail, is to provide a new modular storage apparatus which has many of the advantages of such apparatus known in the art and many novel features that result in a new modular storage apparatus which is not anticipated, rendered obvious, suggested, or even implied by any of the known compositions or methods of treatment, either alone or in any combination thereof.

In satisfaction of the above, Applicant's invention provides an apparatus generally characterized by a base member having an outer shell which serves to house inner components and act as a support structure and anchor for cargo resting on the base member. An interior framework largely comprised of metal tubing provides apparatus stability and acts as a support mechanism for moveable compartments sliding between an open and closed position. A bottom surface contains a series of apertures or grooves configured to align with, and attach to, a vehicle seat support means or cargo tie down rings. Finally, a lockable front cover offers protection from unauthorized removal of the apparatus from the vehicle.

The present invention further includes a series of attachments which reversibly mate with the outer shell of the base member through a series of removable magnets or threaded receptacles. These attachments come in various forms, the most beneficial of which include different sized bins, a gun rack, an insulated enclosure, a clothes rack, or lockable vault.

In view of its general structure, the present apparatus may be anchored to a vehicle surface. Further, the apparatus may secure items contained therein or support items in a fixed arrangement and further provide a means whereby component pieces may be arranged or fitted together in a variety of ways to better accommodate different cargo arrangements. Moreover, the present apparatus provides a means where these items are afforded protection as they may be contained in an insulated or padded environment or held fixed with respect to their surrounding environment.

The present invention is thought to be most beneficial when used in a vehicle, and more particularly an SUV. That is, preferred forms of the present invention have a relatively "low profile," standing on the order of approximately three inches. As such, the apparatus may fit beneath seating contained within vehicles, typically the rear most bench seating or cargo area of an SUV. Such an arrangement is particularly useful in that the apparatus itself, and therefore the items contained therein, remains largely concealed. Moreover, the apparatus is easily accessible from a rear door. Other beneficial arrangements are envisioned where the rear seating is removed so as to provide room for cargo to rest upon the base member.

The most useful forms of the present apparatus are configured for attachment to the "tie-in" bolts of an SUV. That is, preferred forms of the apparatus have apertures within its bottom surface configured to align with vehicle bolts responsible for securing rear seating, or to secure to cargo tie down rings. An apparatus having custom dimensions will conform to the particular make and model of a vehicle to which the apparatus is to be installed. As a result, one may simply remove the rear bench seating of an SUV and "tighten down" the apparatus so as to hold the apparatus in a fixed position.

Interior access is provided by one or more compartments that reversibly slide along opposing guide rails inset along the interior support frame of the apparatus. These guide rails are attached to interior frame supports, extending in parallel fashion. The interior of the compartment may be insulted or padded to offer further protection to items contained therein.

The novelty of the present invention is largely rooted in the combination of its low profile, its ability to attach to the "tie-in" bolts of the vehicle, and its modular nature. The low profile of the present apparatus allows it to readily fit within a typical SUV and further allows the apparatus to support other items resting on top thereof. The ability to attach to the vehicle tie-in bolts provides for unmatched stability of cargo contained within, and resting upon, the base member. In addition, this feature provides high security in making it difficult for anyone to break in and quickly remove the apparatus from the vehicle. Finally, the modular nature of the present invention offers flexibility in the arrangement of cargo not available with known products. The use of various attachments in conjunction with the base member allows cargo to be situated in a multitude of arrangements. These features, alone and in combination with one another, are not found in products known in the art.

BRIEF DESCRIPTION OF THE DRAWINGS

Applicant's invention may be further understood from a description of the accompanying drawings, wherein unless otherwise specified, like referenced numerals are intended to depict like components in the various views.

FIG. 1 is a top sectional view of the preferred embodiment of the present invention.

FIG. 2 is a front view of the preferred embodiment of the present invention.

FIG. 4 is a perspective view of a top surface according to the preferred embodiment of the present invention.

DETAILED DESCRIPTION OF THE PREFERRED EMBODIMENT

Figure 3:
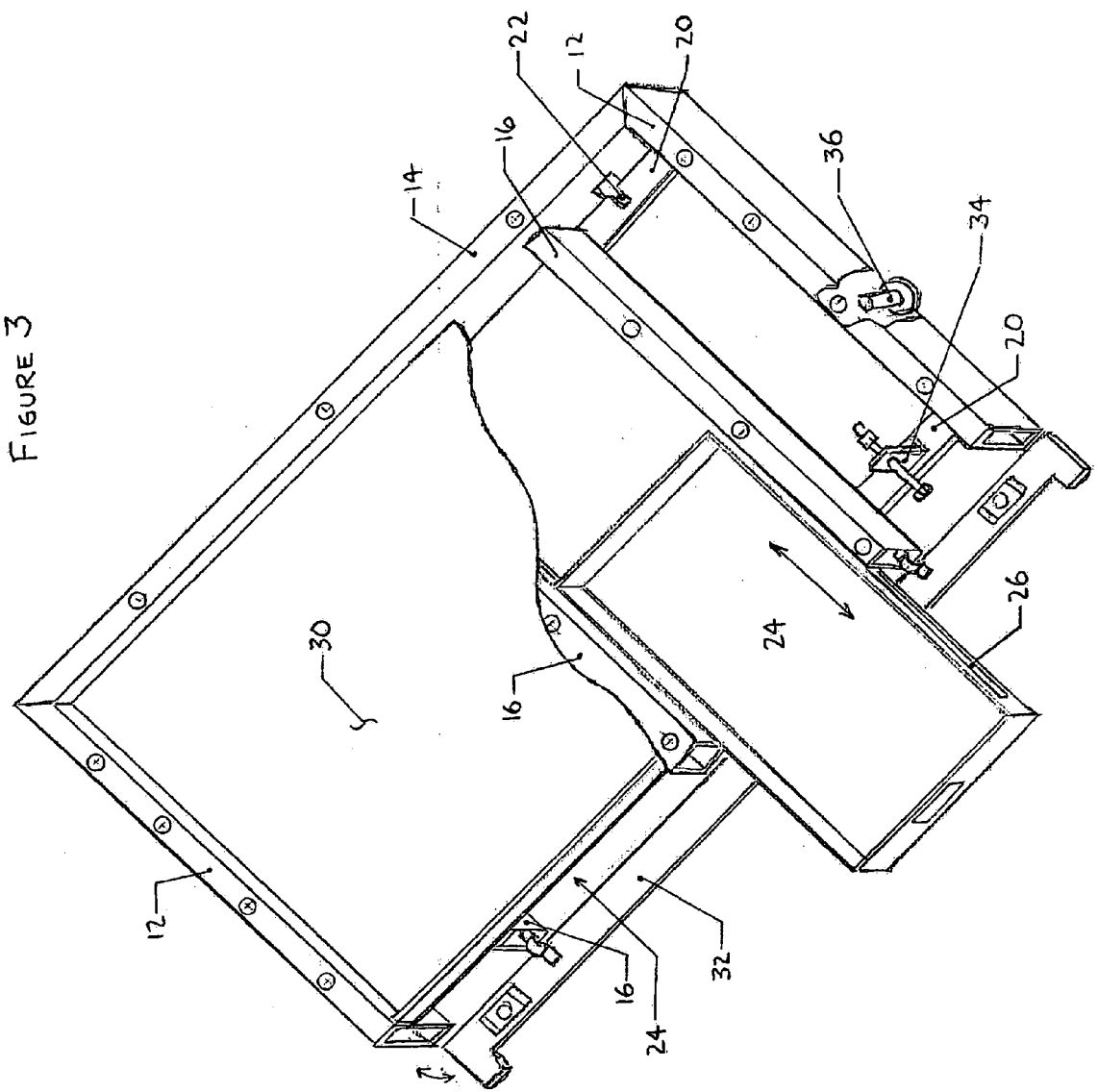
FIG. 3 is a perspective view of the preferred embodiment of the present invention.

The apparatus of the present invention, as depicted in FIG. 1, FIG. 2, and FIG. 3 is generally designated by the reference numeral 10. Apparatus 10, in the preferred embodiment is largely comprised of steel tubing of between eleven and fourteen gauge. Other primary components of apparatus 10 are comprised of sheet metal and insulation or padding material.

Referring to FIG. 1, apparatus 10 has an outer surface combination primarily comprised of outer walls 12 and rear wall 14. As seen, rear wall 14 is joined to each outer wall 12 so as to form a continuous structure. Preferably, walls 12 and 14 are three inches in height and between one inch and two inches in width. As discussed, these dimensions afford the low profile that is desirable in so much as apparatus 10 is to, at times, be situated beneath rear vehicle seating. Further, such dimension is thought to provide the rigidity and support needed to create an enclosure that is high resistible to penetration or alteration. Interior walls 16 are spaced between outer walls 12 and extend in substantially parallel fashion between rear wall 14 and the front portion of apparatus 10. Preferably, interior walls 16 are slightly shorter than walls 12 and walls 14 so as to allow a top surface 30 to be inset within the shape formed by the combination of rear wall 14 and outer walls 12. For example, interior walls 16 are thought to be most beneficial when they stand approximately two inches in height and are between one and two inches in width.

As best seen in FIG. 3, attachment means 36 rests along the interior of the combination of outer walls 12 and rear wall 14. Attachment means 36, in the preferred embodiment, is a series of threaded apertures aligned to reversibly receive various attachments. Other embodiments of attachment means 36 are thought to be male extensions configured to engage with said attachments.

Referring primarily to FIG. 3, top surface 30 is meant to be inset within the shape formed by the combination of outer walls 12 and rear wall 14. Preferably, top surface 30 is thought to be of a dimension so that as it rests upon interior walls 16, a recess of approximately one inch is formed between top surface 30 and the combination of outer walls 12 and rear wall 14. Top surface 30, and its surround walls, form a surface whereby components may better remain secured on top surface 30. Of course, as will be apparent to those skilled in the art, other embodiments are useful where top surface 30 is flush with, or raised from, the combination of rear wall 14 and outer walls 12. Finally, in the preferred embodiment, top surface 30 is coated with some protective material, such as RHINO LINING or some equivalent, to minimize impact of cargo moving about top surface 30.

In the preferred embodiment, the top surface is secured together with other components by fitting within the formed enclosure and being fastened to interior walls 16. As such, interior walls 16 and the top surface have apertures 18 meant to receive some fastening means, such as screws or straps, as known in the art. Top surface, then, may be removed from apparatus 10 thereby providing access to its interior, and more particularly bottom surface 20. Other useful embodiments, however, are envisioned where top surface 30 is simply tack welded to the combination of outer walls 12 and rear wall 14. In many respects, welding top surface 30 is thought to be particularly advantageous as it provides for a sturdier apparatus 10.

Bottom surface 20, in the preferred embodiment, is configured to lend structural support to apparatus 10 and provide a means for removing and fastening apparatus 10 to a vehicle attachment means, such as tie down areas, a seat securing means or cargo tie down rings. More specifically, bottom surface 20 is preferably comprised of a series of elongate members extending between component walls. The particular arrangement of the elongate members comprising bottom surface 20 is not crucial; and, in particular embodiments the relative position of each may be varied to accommodate the arrangement of "tie-down" bolts of particular vehicle models.

Referring to FIG. 1, FIG. 2, and FIG. 3, bottom surface 20 contains a series of grooves or apertures 22, which serve to align with, and secure to, a vehicle attachment means, for example, the tie down bolts of a vehicle. In a straightforward manner, someone may insert the tie down bolts through apertures 22 and then fasten apparatus 10 to the vehicle surface by some fastening means such as a nut or cap as known in the art. Moreover, apparatus 10 contains fastening means 34, which are most beneficial for securing to cargo tie down rings, extending from or set within, the cargo area floor. The ability to fasten and remove apparatus 10 to the floor of a vehicle offers a very high level of security in so much as the apparatus itself, and its contents, cannot be removed from the vehicle with no great effort. Of course, this feature also establishes a means by which cargo within apparatus 10 may remain in a secured position during transit. Finally, as mentioned, lockable front cover 32 may be actuated between a closed position, where it rests upright to conceal compartments 24 and their contents, and an open position, where it rests against the cargo area floor. Cover 32 may be locked in its closed position by some means known in the art so as to prevent one from breaking into apparatus 10. As seen in FIG. 3, cover 32 may be actuated between its open and closed position, remaining attached to other components, namely walls 12 and walls 16, by a hinge or some equivalent.

Again referring to FIG. 1 and to FIG. 3, the preferred embodiment of the present invention further contains compartments 24. Compartments 24 are preferably of a general rectilinear dimension being accessible from their top side. Further, each compartment 24 may be actuated between an open and closed position as each slides between an opposing pair of interior walls 16. Each compartment 24 may be easily accessed by sliding each along the lengths of interior walls 16. While each compartment 24 may be of various widths to best accommodate different types of cargo, each is preferably of the same height as interior walls 16. Moreover, particular embodiments are envisioned where compartments 24 are lined along their interior a padding or insulated material as known in the art to offer protection for cargo contained therein. For example, useful embodiments are thought to incorporate use of RHINO lining or some equivalent thereof. In its most preferred form, compartments 24 slide between their open and closed position along interior walls 16 along track members 26. Track members 26 each comprise a pair of parallel rails, on which compartment 24 slide between their open and closed position. Track members 26 may be of a number of suitable configurations allowing for such sliding motion; however, preferably members 26 are those produced by ACCURIDE INTERNATIONAL, Inc. of Santa Fe Springs, Calif., and are of model family 3732.

The base member of apparatus 10 as described above interacts with various attachments through an arrangement of magnets 28. Magnets 28 may be arranged along the top surface of apparatus 10 so as to align with associated attachments. Magnets 28, although relatively small in size, are relatively strong. In the preferred embodiment, magnets 28 are those manufactured by K & J MAGNETICS, Inc. and are the MM-A model family. These magnets are held out as having an excellent strength to size ratio and are further preferred as their flat surfaces lend themselves to secure attachment to component surfaces and as each has a central aperture for engagement with attachment members. As best seen in FIG. 1 and FIG. 3, magnets 28 may be placed along the top surface and arranged in any number of ways so as to accommodate various attachments.

As best seen in FIG. 4, most useful embodiments of apparatus 10 include various attachments, generally designated by reference numeral 40, engaged with the base member through magnets 28 or threaded extensions received at threaded apertures 36. The attachments vary according to their desired function and purpose. For instance, particularly useful embodiments are envisioned where apparatus includes an attachment 40 that is a gun rack, a basket receptacle, a clothes rack, or an insulated receptacle. An advantageous attachment 40 has been found to b a folding basket as manufactured by PENNCLYCLE of Twin Cities, Minn. In such case, the basket attachment is secured to the base member as magnets 28 hold each along the top surface and bottom surface, respectively.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:
1. A modular storage apparatus comprising
   a first outer wall and second outer wall
      where each outer wall has a front end and a rear end, where said first outer wall and said second outer wall are joined, at their rear end, with a rear wall so that the combination of said first outer wall, said second outer wall, and said rear wall forms a partial receptacle;
   one or more interior wall members
      arranged between said first outer wall and said second outer wall where each interior wall member extends in substantially parallel fashion, from said rear wall to the front end of each outer wall;
   a bottom surface
      attached to said first outer wall, said second outer wall, said rear wall, and said interior member, where said bottom surface is configured to align with, and attach to, a vehicle attachment means;
   a top surface
      configured to align with said first outer wall, said second outer wall, and said rear wall so as to form an enclosure there between and reversibly attach thereto;
   one or more compartments
      where each compartment has a front end and a rear end and each fits between an opposing pair of one of said one or more interior wall members and is actuated between an closed position, where the rear end of said compartment is in proximity with said rear wall and the front end of said compartment aligns with said first outer wall, said second outer wall, said bottom surface, and said top surface to form an enclosure there between, and a open position, where the rear end of said compartment is in proximity with said front end of said first outer wall and said second outer wall and said compartment front end extends so as to expose the interior of said compartment.

2. The apparatus of claim 1 further comprising
   at least one magnet
      having a flat bottom surface, a flat top surface, and a central aperture, where said magnet may be juxtaposed with said top surface and arranged to support an attachment member.

3. The apparatus of claim 1 where said first outer wall, said second outer wall, and said rear wall stand approximately three inches in height.

4. The apparatus of claim 1 where said top surface fits within the shape defined by an interior surface of said first outer wall, an interior surface of said second outer wall, and an interior surface of said rear wall and rests upon a top contour of said interior wall members.

5. The apparatus of claim 4 where said first outer wall, said second outer wall, and said rear wall, stand approximately three inches in height, where each said interior wall member stands approximately two inches in height, and said top surface has a thickness of approximately one half inch.

* * * * *